(12) United States Patent  
Trask (10) Patent No.: US 7,571,163 B2
(45) Date of Patent: Aug. 4, 2009

(54) METHOD FOR SORTING A DATA STRUCTURE

(75) Inventor: Barrett A. Trask, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1107 days.

(21) Appl. No.: 10/890,965

(22) Filed: Jul. 13, 2004

(65) Prior Publication Data

US 2006/0015510 A1   Jan. 19, 2006

(51) Int. Cl.
*G06F 17/30* (2006.01)
(52) U.S. Cl. .............................. 707/7; 707/100; 707/10
(58) Field of Classification Search .................. None
See application file for complete search history.

(56) References Cited

U.S. PATENT DOCUMENTS 5,889,999 A * 3/1999 Breternitz et al. ........... 717/158
6,233,244 B1   5/2001 Runaldue et al.
6,360,219 B1 * 3/2002 Bretl et al. ...................... 707/8
6,658,596 B1   12/2003 Owen et al.
6,678,754 B1   1/2004 Soulier

* cited by examiner

*Primary Examiner*—Charles Rones
*Assistant Examiner*—Belix M Ortiz (57) ABSTRACT

A method is provided for performing a weak sort on a data structure comprising a plurality of list elements, the elements being associated with data values. The linked list data structure can have a head element containing a comparatively lower data value and a tail element containing a comparatively higher data value. One operation is identifying the head element and tail element of the data structure. The method can also include the operation of calculating a weighted mean value of the data values of the head and tail elements. A further operation can be inserting a new list element into the data structure, the location of the insertion in the data structure being dependent upon the data value of the new element as compared to the weighted mean value.

21 Claims, 5 Drawing Sheets

METHOD FOR SORTING A DATA STRUCTURE

FIELD OF THE INVENTION

The present invention relates generally to sorting of a data structure.

BACKGROUND

The amount of memory available in computers has grown at an exponential pace. It is not uncommon for personal computers to have more than a gigabyte of memory. However, the demand for memory has grown exponentially as well. Video games, movies, high resolution graphics, and complex software all require large amounts of memory. To meet the vast requirements for memory, operating systems designed to control computers have historically supplemented physical memory with virtual memory. Virtual memory is usually supported by another storage medium that is larger than the physical memory or random access memory (RAM). For example, a hard disk drive can be used to store information when a computer's memory needs exceed the physical memory that exists.

Physical and virtual memory may be allocated to processes and programs by the operating system in portions of memory called pages. Each page can represent a minimum predetermined amount of physical memory that is being allocated by the operating system. Each program can track memory usage with data structures that store or point to memory allocations of varying size. The nodes in the data structure can represent multiple pages of memory or a fraction of a page of memory. The data structure can be used by the program to manage the allocated memory.

Typically, a program running on a computer may request that a predetermined amount of memory be allocated from the operating system when the program needs storage space. For example, the program may need 100 data records worth of memory. If there are 10 data records in every page, then the operating system can allocate 10 pages of memory to the program. When the pages of memory are no longer needed, they can be de-allocated by the operating system and become free for use by another program or thread. For instance, if 10 data records are no longer needed by the program, they can be de-allocated. However, if the memory is not de-allocated efficiently, the computer may be left with 10 pages that are 90% full, where each page has one free data record instead of a free page of memory.

Allocating and de-allocating memory from the operating system can require a relatively large amount of time for a program, especially when the slower virtual memory system is accessed. In order to maximize memory usage efficiency, the program can optimize management of its already allocated memory. Thus, instead of constantly allocating and de-allocating memory from the operating system, the program can take advantage of memory already allocated to the program from the operating system that is not being used. One method for doing this is to create a list of free memory sub-pages or locations contained within the memory pages allocated to a program.

With gigabytes of memory being used in modern computers, however, the list can become very large. The resources required to organize and/or sort the list of memory that has been allocated to the program but is not being used can be greater than any benefit derived from maintaining such a list.

SUMMARY OF THE INVENTION

A method is provided for performing a weak sort on a data structure comprising a plurality of list elements, the elements being associated with data values. The linked list data structure can have a head element containing a comparatively lower data value and a tail element containing a comparatively higher data value. One operation is identifying the head element and tail element of the data structure. The method can also include the operation of calculating a weighted mean value of the data values of the head and tail elements. A further operation can be inserting a new list element into the data structure, the location of the insertion in the data structure being dependent upon the data value of the new element as compared to the weighted mean value.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 1:
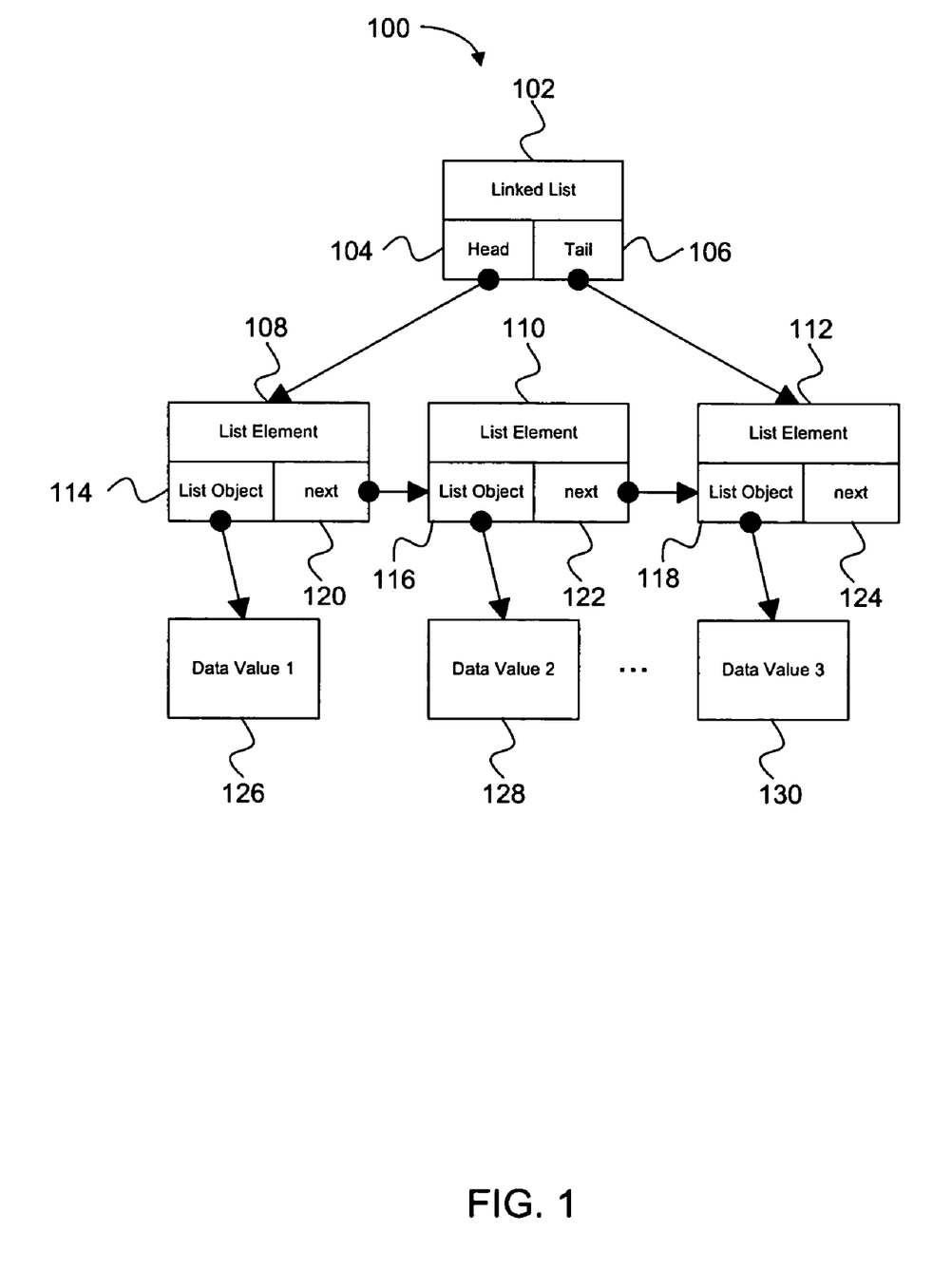
FIG. 1 is a block diagram of a linked list data structure in accordance with an embodiment of the present invention.

As illustrated in FIG. 1, a data structure 100 can be configured as a linked list 102 having a head 104 and a tail 106. The linked list data structure can be organized to allow the data in the linked list to be biased in a desired direction. The linked list can comprise a plurality of list elements 108-112, wherein each list element is composed of a list object 114-118 and a next pointer 120-124. The list object can refer to data values 126-130 that are to be organized. A list object can be a data record or value such as a memory address, an individual's contact information, or another element of data. The data record or value can be a numeric or alphabetic value. The next pointers can be used to link to the next list element in the list. A linked list can be organized using a weak sort method to arrange the list elements according to the data values of the list objects. The data values can be symbols which are sorted alphabetically, numerically, or both.

In the past, some weak sort methods were applied using a three-step process. An example of a previously used weak sort method for inserting a new data value into a linked list will now be described. First, if the new data value has a value that is "less than" the data value currently at the head of the list, then the new element with the new data value can be added to the list as the new head. In addition, a pointer can be set to point from the old head to the new head. Second, if the data value in the new element has a value "greater than" the value of the data value in the list object at the tail of the list, then the new element can be added as the new tail with a pointer pointing from the new tail to the old tail. Otherwise, the new element has typically been inserted into the list just in front of the tail. Alternatively, the new element may always be inserted after the head element. This is because defining which end of the list is the head and which is the tail can be a matter of perspective and may also depend upon the direction of the sort.

When the list is sorted using the prior art weak sort method above, there is a general tendency to group list elements with high valued list objects toward the tail of the list. There is a stronger tendency to group low elements toward the head of the list. Anything in the "middle" with a data value in between the head and tail data values is placed just in front of the tail. Organizing the list in this manner can result in the front of the list being reasonably sorted. Specifically, each successive new head added will result in a sequential order. However, the tail of the list can be quite randomized. Each new "middle" insertion is usually inserted at the same place in front of the tail. So even if the tail is a good endpoint, any "middle" insertions after the last "new" tail will break up the association created by making the new tail. Thus, one end of the list can be well sorted, but the other end of the list can remain quite unsorted.

The present invention provides an improved method for organizing a list. A weak sort can be performed wherein a new data value can be inserted into a list according to a simple mean or weighted mean of data values from the head and tail elements of the list. A weighted mean value can be found by multiplying the data value associated with the head element by a percentage weight and multiplying the data value associated with the tail element by the remaining weight factor (i.e., these should sum to 100%). For example, the weighted mean value may be calculated like this:

$$\text{WeightedMean} = (0.7 \times \text{Head}) + (0.3 \times \text{Tail}).$$

Similarly, a weighted mean that is the simple mean can be calculated like this:

$$\text{WeightedMean} = (0.5 \times \text{Head}) + (0.5 \times \text{Tail}).$$

In one embodiment of the invention, the weighted value can be determined by any function of the two endpoints that results in a value that occurs in the range described by the endpoints (i.e., the head and tail). For example, the endpoints can be multiplied by fractional values or other coefficients as long as the sum of the coefficients is equal to one. Other weighting schemes can also be used. Using a weighted mean value instead of just the simple mean value can cause the list to be better sorted on one side as opposed to the other side. This can be used to weak sort the list proportionally to the expected rates of consumption of elements from opposite ends of the list.

It should also be noted that before it is possible to compute a numeric weighed mean on alphabetic or alphanumeric data values, the values need to be assigned numeric equivalents. For example, an alphabetic data value can be considered to be a base-27 numeric value with the digit assignment of a=1, b=2, . . . , z=26, and a "blank" or "space"=0. To make a comparison between two strings, they must be converted to numeric value based on the length of the longer string (the shorter string is padded at the end with spaces). Leading spaces may be used in the computation of string length, depending on the application. For example, "abc" is the value $(1*27^2)+(2*27)+3=786$ (in decimal). To compare to the string "bc" a space must be added to make the length equal before doing the comparison. Therefore, "bc_"=$(2*27^2)+(3*27)+0=1539$. If the string was not padded for the comparison, "bc" would equal $(2*27)+3=57$, which does not preserve the sort order "abc"<"bc". When attempting to calculate a mean value over the entire list (and for any comparison thereafter), the length to which to pad should depend on the maximum string length for the entire list. Any other methods for assigning numeric equivalents to alphabetic or alphanumeric strings that preserves the original sort order may also be used.

In another embodiment of the invention, the system and method for organizing a list can be used to manage the allocation of memory in a software application or program more efficiently. Memory used by a program can be divided into three different classes. The first class is memory that is allocated to the program by the operating system and is in use. The second class is memory that is allocated to the program and is not in use. The third class is memory that is not allocated.

A linked list can be used by a program to optimize the second class of memory, which is memory that is allocated to the program but is not in use. Then when allocating memory within the program, the program can first use any free blocks of memory in currently allocated pages from the linked list. If there is not enough currently allocated memory available in the free list, the program can allocate a new page of memory from the operating system. Usually, a higher numbered page is used each time new memory is allocated to the program from the operating system. This means that it can be assumed that the highest numbered page is only partially full with free space still available to the program.

By creating a linked list with a list of the allocated but unused memory, the list can act as a cache of the memory storage that has been allocated to a program but is not currently being used. The weak sort method of the present invention can bias the list such that higher numbered addresses are located at the tail and lower numbered addresses are near the head of the list. As memory is moved from the first class to the second class (i.e., used to not used), the weak sort method of the present invention can choose the head or tail of the list for inserting the available memory addresses based upon the current list contents. This allows both sides of the list to be substantially equally sorted. Such a sorting algorithm is valuable for managing the allocated but unused memory blocks.

As memory is needed by a program, the program will take allocated but unused memory from the head of the list, which contains memory from the second class listed above. The list elements near the head of the linked list will tend to be lower addressed memory locations due to the present method. This is advantageous because it mimics the behavior of virtual memory by allocating lower addresses first. Using the lower addresses first has a tendency to keep the range of "in use" memory addresses as small as possible by maximizing the use of the lower numbered allocated data structures. In addition, the use of lower addresses can minimize the use of higher numbered allocated data structures, thus freeing the higher numbered pages to be returned to the operating system's free memory pool.

When memory is to be returned to the operating system, the list elements can be removed from the tail of the list until the total amount of memory to be freed is reached. If the operating system needs to have whole pages returned from the program before the memory can be reclaimed, the present invention increases the likelihood of freeing whole, high address pages over the previous method.

Figure 2:
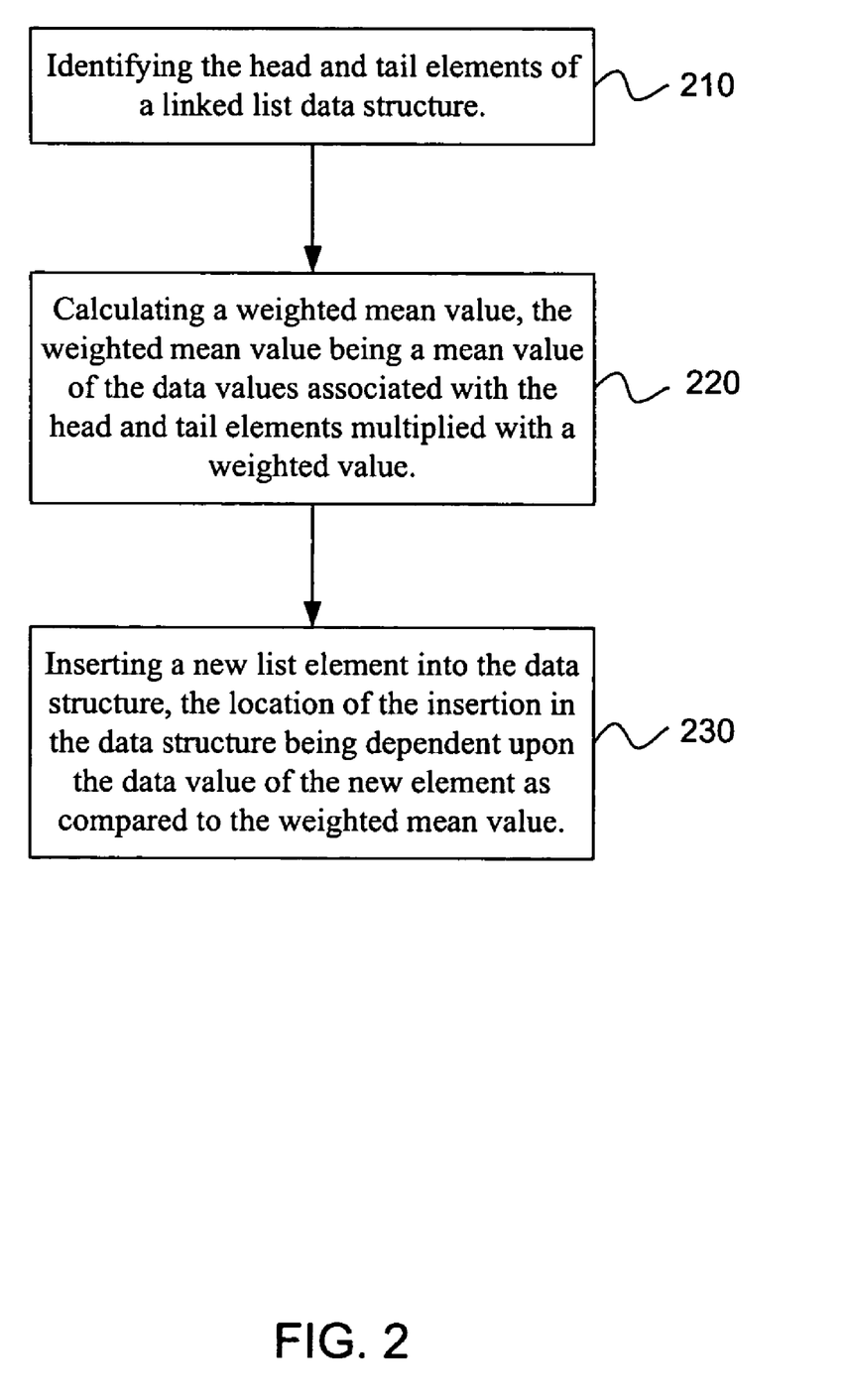
FIG. 2 is a flow chart depicting a method for performing a weak sort on a linked list data structure in accordance with an embodiment of the present invention.

A method for efficiently managing memory can be implemented by applying an improved weak sort method to a linked list containing allocated but unused memory for a program. An embodiment of the invention provides a method for performing a weak sort on a linked list data structure comprising a plurality of list elements, as shown in FIG. 2. A method is provided for performing a weak sort on a data structure comprising a plurality of list elements, each list element having an associated data value, with a head element of the data structure having a comparatively lower data value and a tail element of the data structure having a comparatively higher value. The method includes the operation 210 of identifying the head and tail elements of a linked list data structure. The head and tail elements can contain or reference the comparatively lower and comparatively higher data values, respectively, stored in the list elements. The head and tail may not always be the absolute maximum and minimum since the list is not perfectly sorted. When list elements at the head or tail are removed, then the list element remaining at the top or bottom will become the new head or tail but may not be the minimum or maximum in the list.

A new list element with a data value less than the data value of the head can replace the head and become a possibly better approximation of the minimum data value. Likewise, a new list element with a data value greater than the data value of the tail can replace the tail and become a possibly better approximation of the maximum data value. As a plurality of new elements is added to the list, the head and tail can again become a good approximation for the minimum and maximum respectively.

The method can include the further operation of calculating a weighted mean value, the weighted mean value being a weighted mean value of the data values associated with the head and tail elements, as shown in block 220. Then a new list element can be inserted into the data structure, the location of the insertion in the data structure being dependent upon the data value of the new element as compared to the weighted mean value, as in block 230. Unlike previous weak sort methods, the present invention can compare the data value of the new list element with the weighted mean value calculated using the data value of the head element and the data value of the tail element. If the data value of the new list element is less than the weighted mean value and will not be the head value, then the new list element can be inserted after the current head element with the head element pointing to the new list element. Otherwise, the data value is inserted before the current tail element, with the new list element pointing to the current tail element. Each time a new head or tail is created, via either insertion or deletion, the mean can be recomputed.

Using a weighted mean value of the head and tail element data values enable the list to be weighted in such a way that one side of the list can be more sorted than the other side, rather than equally sorting both sides of a list. As previously discussed, the head and tail values can be multiplied by predetermined weighting values, which enables the list to be better sorted on one side in proportion with the predetermined weighting values. A special weighting case can be a weighting of 0.5 for each of the head and tail values in which both sides of the list are sorted substantially equally according to the simple mean value of the head and tail element data values. In other words, a weighting of 0.5 on the head and tail data values produces a simple mean as compared to a weighted mean.

Figure 3:
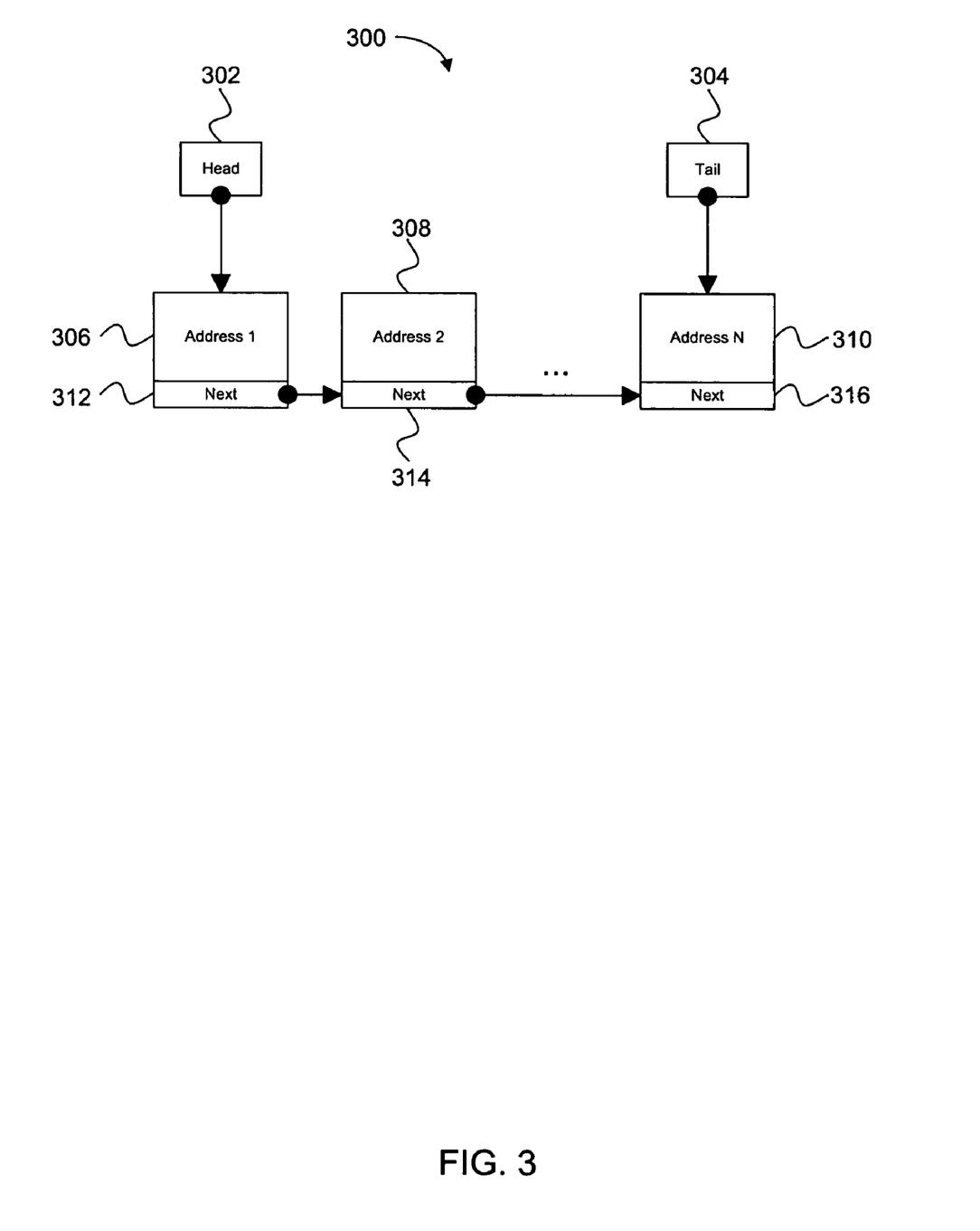
FIG. 3 is a block diagram of a linked list data structure in an embodiment of the present-invention for use with computer languages that use explicit memory management.

In one embodiment, the present weak sort method can be applied to manage an internal free memory list for programs created using computer languages that use explicit memory management. When memory is allocated in an explicit memory management language for a new structure or object, a memory address is returned for a block of memory of the requested size. Usually, the structure can have a self-referential pointer, wherein the pointer can refer to another object of the same type. In one embodiment, the pointer can refer to its own address. Thus, as shown in FIG. 3, an explicit memory management linked list 300 can be created comprising a head 302, which can point to a list element starting with the comparatively lower memory address 306. The linked list can also include a tail 304 which can point to a list element starting with the comparatively higher memory address 310. A plurality of list elements 308 can be located between the head element and the tail element. Pointers 312 and 314 are used to point from the head element through all the elements in the list and end with the tail element. The tail element can contain a pointer 316, though this pointer may point to a null value to signify the tail of the list.

After memory has been allocated but is no longer being used by the program, the now unused memory address or data structure can be inserted into the list according to the present weak sort method. If the data structure is less than the head element data value 306, it can be inserted as the new head of the list. If the unused memory address is greater than the tail element data value 310 it can be inserted as the new tail of the list. Otherwise, a mean of the head and tail elements' data values can be calculated. Then the unused memory address can be placed behind the head if the unused memory address is less than the weighted mean and placed in front of the tail if the address is greater than the weighted mean.

As discussed previously, organizing the memory list in such a manner is advantageous because it mimics the behavior of virtual memory, which allocates lower addresses first. The present invention can be used to sort lower addressed memory near the head of the list. Using the lower addresses first has a tendency to keep the range of "in use" memory addresses as small as possible by maximizing the use of the lower numbered allocated pages. The use of higher numbered allocated addresses, which are organized near the tail of the list, can be minimized and free the higher numbered pages to be returned to the operating system's free memory pool.

Figure 4:
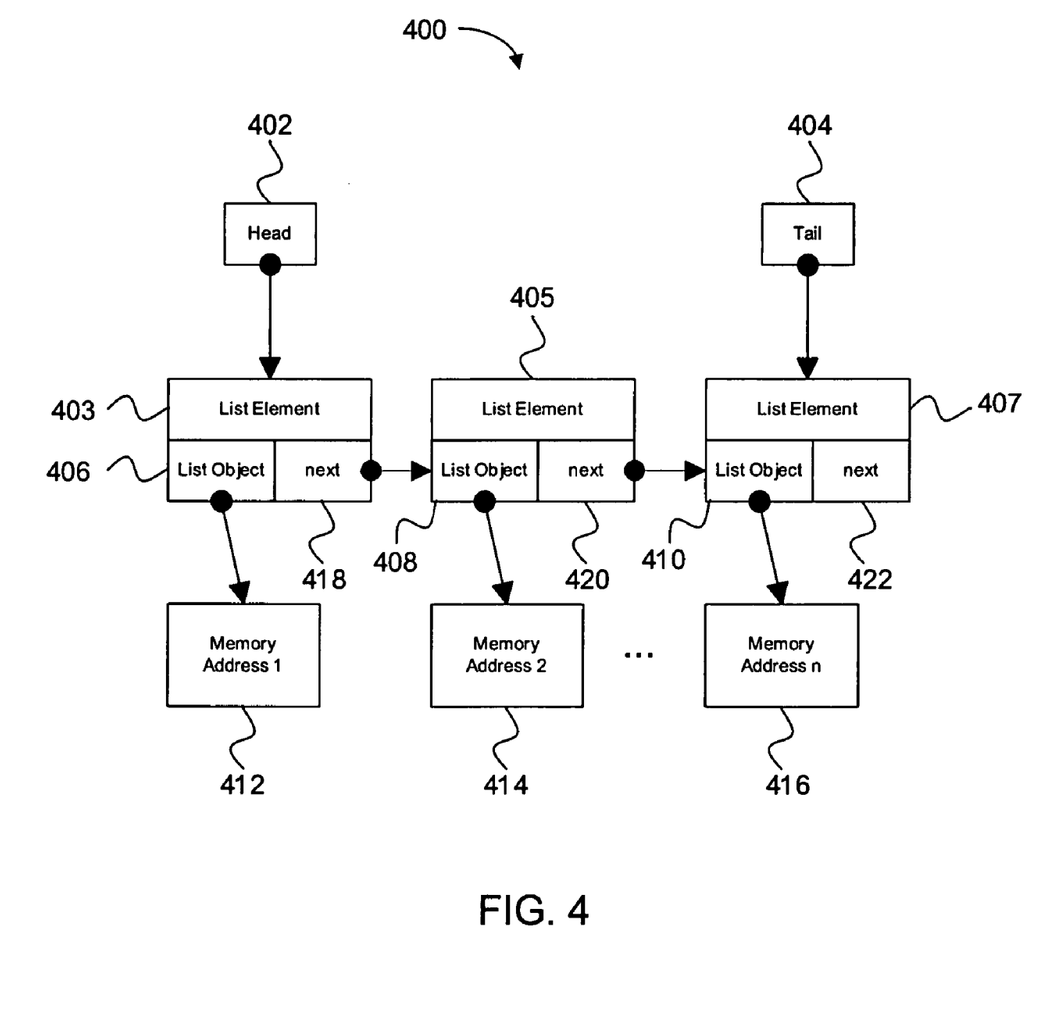
FIG. 4 is a block diagram of a linked list data structure for use with computer languages that do not use explicit memory management in accordance with an embodiment of the present invention.

In one embodiment, the present weak sort method can be applied to create an internal memory list for computer languages that do not use explicit memory management. In this case, the structure may not have a self-referential pointer and a container structure can be used for each of the unused memory addresses. FIG. 4 shows a linked list 400 comprising a head 402 pointing to a list element 403 with a list object 406 pointing to a memory address 412. A tail 404 can point to a list element 407 with a list object pointer 410 pointing to a memory address 416. The memory address 412 can be an approximate minimum address in the list and the address 416 can be an approximate maximum address in the list. A plurality of list elements 405 with list objects 408 pointing to memory addresses can be located between the head element and the tail element. A new element can be added to the linked list using the weak sort method of the present invention.

Figure 5:
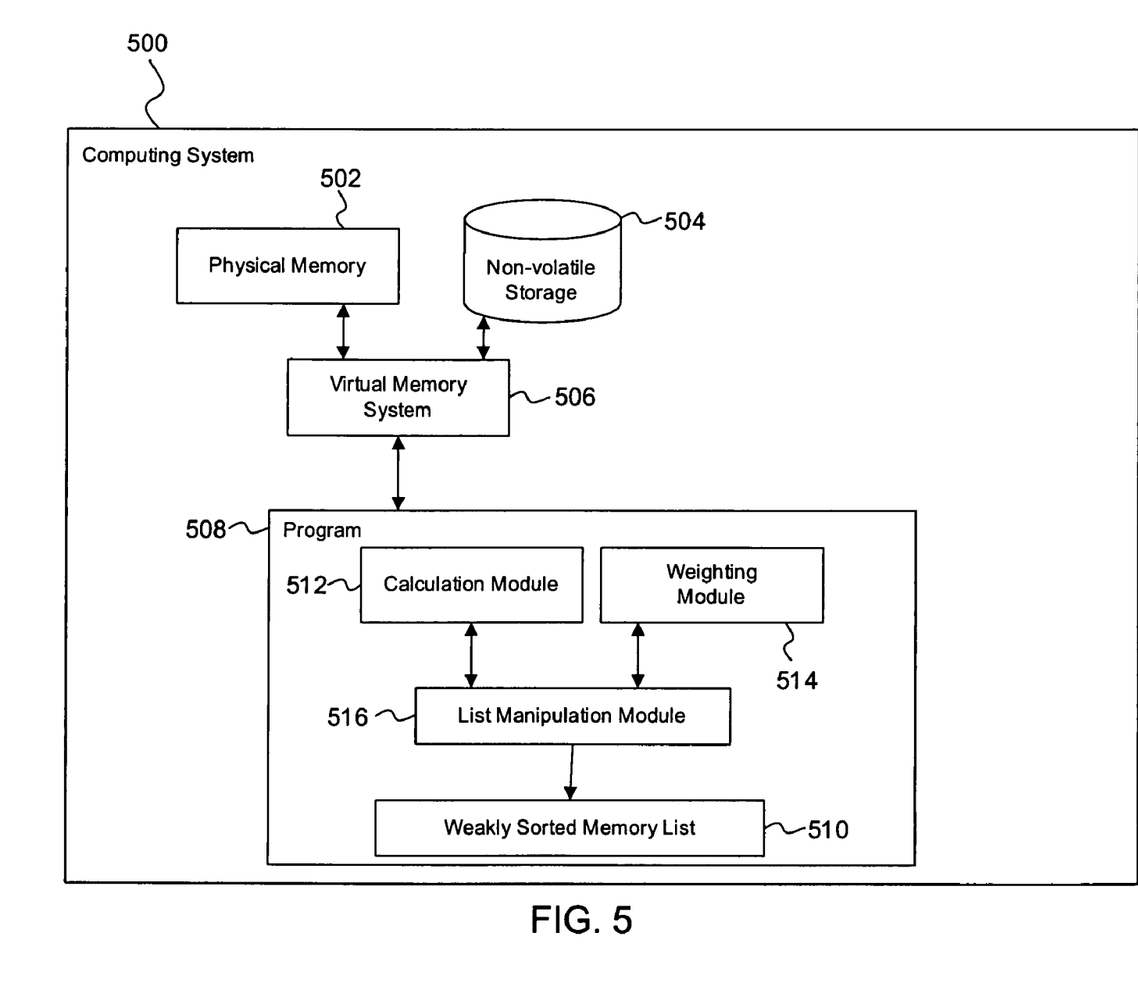
FIG. 5 is an embodiment of a device for performing a weak sort on a data structure comprising a plurality of list elements as illustrated in FIG. 5.

An additional embodiment of the invention is a device for performing a weak sort on a data structure comprising a plurality of list elements as illustrated in FIG. 5. The device includes a computing system 500 that contains physical memory 502 and a non-volatile storage system 504 that are controlled by or are interfaced with a virtual memory subsystem 506. An executable program 508 can be executing on the computing system within an operating system (not shown). The program can have a memory list that it desires to weakly sort 510. In order to weakly sort the list, the program includes a list manipulation module 516 that can perform the insertion, deletion, and related manipulation operations described previously. In addition, the program can use a calculation module 512 in combination with a weighting module 514 to calculate the weighted mean values for the weakly sorted memory list.

The embodiments of this invention have been described using a linked list. However, other list types of data structures can be use with the present invention. For example, an indexed array, a binary tree, or a doubly linked list can be used in the present invention.

The improvement to the weak sort method can significantly alter the overall organization of the linked list structure. A properly sorted linked list structure can better organize use of memory by programs. The improved weak sorting ability can lead to increased usage of the lower numbered pages of allocated memory, allowing the higher numbered pages to be de-allocated, thus limiting the overall memory usage. The present invention results in better system memory utilization at a very low performance cost.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for performing a weak sort on a data structure representing computer memory allocated by a program from an operating system on a computer, the data structure comprising a plurality of list elements, each list element having an associated data value, with a head element of the data structure having a comparatively lower data value than a data value of a following element in the data structure and a tail element of the data structure having a comparatively higher value than a data value of a previous element in the data structure, the method comprising the steps of:
   identifying the head element and tail element of the data structure;
   calculating a weighted mean value by multiplying at least one weighting value with the head element and tail element; and
   inserting a new list element into the data structure, the location of the insertion into the data structure being dependent upon the data value of the new list element as compared to the weighted mean value, wherein the new list element is inserted immediately behind the head element of the data structure provided that the new list element's data value is less than the weighted mean value and greater than the data value in a current head element.

2. The method as in claim 1, further comprising the step of inserting the new list element in front of the tail element of the data structure provided that the new list element's data value is greater than the weighted mean value and less than the data value of the tail element.

3. The method as in claim 2, further comprising the step of inserting the new list element immediately in front of the tail element of the data structure provided that the new list element's data value is greater than the weighted mean value and less than the data value in the current head element.

4. The method as in claim 1, further comprising the step of inserting the new list element as the head element of the data structure provided that the new list element's data value is less than the data value of a current head element in the data structure.

5. The method as in claim 1, further comprising the step of inserting the new list element as the tail element of the data structure provided that the new list element's data value is greater than the data value of a current tail element in the data structure.

6. The method as in claim 1, further comprising the step of weighting the mean value with a predetermined weighting value such that one side of the list is sorted in accordance with the predetermined weighting value.

7. The method as in claim 6, wherein the step of weighting the mean value with the predetermined weighting value further comprises the step of applying a weighting value that is a fractional value between 0 and 1.

8. The method as in claim 1, further comprising the step of removing at least one list element from an end of the data structure.

9. A method for organizing a list of allocated memory blocks that are not in use by a program operating in a computer, comprising the steps of:
   creating a list of a plurality of data structures representing memory locations that are not in use, wherein the list comprises a plurality of list elements, each list element having a memory address for memory not in use and a pointer to a next list element, said list having a head element and a tail element;
   calculating a weighted mean value of the memory addresses of the head element and the tail element;
   inserting a new list element into the list at a location dependent upon a comparison of the memory address of a new element to the weighted mean value;
   wherein the new list element is inserted immediately after the head element of the list provided that the new list element's memory address is less than the weighted mean value; and
   wherein the new list element is inserted immediately before the tail element of the list provided that the new list element's memory address is greater than the weighted mean value.

10. The method as in claim 9, wherein the step of creating a list of a plurality of data structures representing memory locations that are not in use, further comprises the step of creating the head element of the list, the head element having a comparatively low memory address and the pointer to the next list element.

11. The method as in claim 9, wherein the step of creating a list of a plurality of data structures representing memory that are not in use further comprises the step of creating the tail element of the list having a comparatively high memory address.

12. The method as in claim 9, further comprising the step of inserting the new list element as the head element of the list provided that the new list element's memory address is less than the memory address of the head element in the list.

13. The method as in claim 9, further comprising the step of inserting the new list element as the tail element of the list provided that the new list element's memory address is greater than the memory address of the tail element in the list.

14. The method as in claim 9, further comprising the step of weighting the mean with a value of 0.5 to enable the list to be sorted based on a simple mean.

15. A method for organizing a linked list data structure representing computer memory allocated by a program from an operating system on a computer, the data structure, the data structure comprising a plurality of list elements, each list element having a data value, with a substantially minimum data value at a head element and a substantially maximum data value at a tail element of the linked list data structure, comprising the steps of:
  inserting a new element as the head element of the linked list data structure provided that the data value of the new element is less than the data value of the head element;
  inserting the new element as the tail element of the linked list data structure provided that the data value of the new element is greater than the data value of the tail element;
  inserting the new element immediately after the head element of the linked list data structure provided that the associated data value of the new element is less than a weighted mean value of the head element and tail element data values; and
  inserting the new element immediately before the tail element of the linked list data structure provided that the associated data value of the new element is greater than the mean value of the head element and tail element data values.

16. The method of claim 15, further comprising the step of computing a new mean value of the head element and tail element data values provided that a new head element is created.

17. The method of claim 15, further comprising the step of computing the new mean value of the head element and tail element data values provided that a new tail element data is created.

18. An article of manufacture, comprising:
  a computer usable medium having computer readable program code embodied therein for organizing a list of allocated memory blocks that are not in use, the computer readable program code in the article of manufacture comprising:
  computer readable program code configured to create a list of a plurality of allocated blocks of memory that are not in use, the list comprising a plurality of list elements, each list element containing at least a memory address for each block of memory not in use and a pointer pointing to a next list element, said list having a head element and a tail element;
  computer readable program code configured to calculate a weighted mean value of the memory addresses of the head element and the tail element;
  computer readable program code configured to insert a new list element into the list according to the weighted mean value
  computer readable program code configured to insert the new list element immediately behind the head element of the data structure provided that the new list element's data value is less than the weighted mean value and greater than the data value in a current head element; and
  computer readable program code configured to insert the new list element immediately in front of the tail element of the data structure provided that the new list element's data value is greater than the weighted mean value and less than the data value in the current tail element.

19. The article of manufacture as in claim 18, further comprising computer readable program code configured to insert the new list element as the head element of the data structure provided that the new list element's data value is less than the data value of a current head element in the data structure.

20. The article of manufacture as in claim 18, further comprising computer readable program code configured to insert the new list element as the tail element of the data structure provided that the new list element's data value is greater than the data value of a current tail element in the data structure.

21. The article of manufacture as in claim 18, further comprising computer readable program code configured to weight the mean value with a predetermined weighting value such that one side of the list is sorted in accordance with the predetermined weighting value.

* * * * *

UNITED STATES PATENT AND TRADEMARK OFFICE
CERTIFICATE OF CORRECTION

PATENT NO. : 7,571,163 B2 Page 1 of 1
APPLICATION NO. : 10/890965
DATED : August 4, 2009
INVENTOR(S) : Barrett A. Trask It is certified that error appears in the above-identified patent and that said Letters Patent is hereby corrected as shown below:

In column 10, line 10, in Claim 18, after "value" insert -- ; --.

Signed and Sealed this

Nineteenth Day of January, 2010

David J. Kappos
*Director of the United States Patent and Trademark Office*